(12) United States Patent
Kim

(10) Patent No.: US 12,391,112 B2
(45) Date of Patent: Aug. 19, 2025

(54) AIR FLAP APPARATUS FOR VEHICLE

(71) Applicant: HYUNDAI MOBIS CO., LTD., Seoul (KR)

(72) Inventor: In Cheol Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 215 days.

(21) Appl. No.: 18/205,105

(22) Filed: Jun. 2, 2023

(65) Prior Publication Data
US 2024/0300319 A1     Sep. 12, 2024

(30) Foreign Application Priority Data

Mar. 8, 2023   (KR) .................. 10-2023-0030279

(51) Int. Cl.
*B60K 11/08*     (2006.01)
(52) U.S. Cl.
CPC ................... *B60K 11/085* (2013.01)
(58) Field of Classification Search
CPC ............ B60K 11/08; B60K 11/085; B60H 2001/3478; B60H 1/00871; B60H 1/00671; B60H 1/00678; B60H 2001/00707
See application file for complete search history.

(56) References Cited

U.S. PATENT DOCUMENTS

| | | | |
|---|---|---|---|
| 11,987,116 B2* | 5/2024 | Müller | B60R 19/52 |
| 2020/0215900 A1* | 7/2020 | Kim | B60K 11/06 |
| 2021/0114670 A1* | 4/2021 | Kim | F01P 7/10 |
| 2022/0080823 A1* | 3/2022 | Kim | F01P 7/10 |
| 2022/0250445 A1* | 8/2022 | Kim | B60H 1/3421 |
| 2022/0266655 A1* | 8/2022 | Kim | B60H 1/345 |
| 2023/0077641 A1* | 3/2023 | Byun | B60K 11/085 |
| | | | 296/180.5 |
| 2023/0078614 A1 | 3/2023 | Byun et al. | |
| 2023/0125506 A1* | 4/2023 | Takita | B60K 11/085 |
| | | | 165/96 |

(Continued)

FOREIGN PATENT DOCUMENTS

| DE | 20 2022 105 146 U1 | 1/2023 |
|---|---|---|
| KR | 10-2021-0033181 A | 3/2021 |

OTHER PUBLICATIONS

Office Action issued in German Patent Application DE 102023115037.5 dated Apr. 12, 2024, with English translation.

*Primary Examiner* — Nelson J Nieves
(74) *Attorney, Agent, or Firm* — MORGAN, LEWIS & BOCKIUS LLP

(57) ABSTRACT

The present disclosure relates to an air flap apparatus for a vehicle, which is improved to prevent an air flap from being rotated by a traveling wind generated when the vehicle travels at a high speed. The air flap apparatus for a vehicle includes a frame disposed behind a grill of a vehicle, an air flap that opens or closes an air inlet formed in the frame, a power transmission unit that is connected to the air flap and rotates the air flap, and a driving unit that is disposed outside the frame and generates power, wherein the power transmission unit includes a link that is connected to the air flap and rotates the air flap, and a loader that is connected to the driving unit, is rotated by the power generate by the driving unit, and stops movement of the link when the air flap closes the air inlet.

8 Claims, 11 Drawing Sheets

(56) References Cited

U.S. PATENT DOCUMENTS

| | | | |
|---|---|---|---|
| 2023/0182563 A1* | 6/2023 | Jeong | B60K 11/085 |
| | | | 180/68.1 |
| 2023/0202289 A1* | 6/2023 | Jeong | B60K 11/085 |
| | | | 180/68.1 |
| 2023/0286373 A1* | 9/2023 | Harter | B60K 11/085 |
| 2023/0415564 A1* | 12/2023 | Müller | F01P 7/10 |
| 2024/0246501 A1* | 7/2024 | Zhu | B60R 19/52 |
| 2025/0042242 A1* | 2/2025 | Kim | B60K 11/085 |

\* cited by examiner

[FIG. 1]
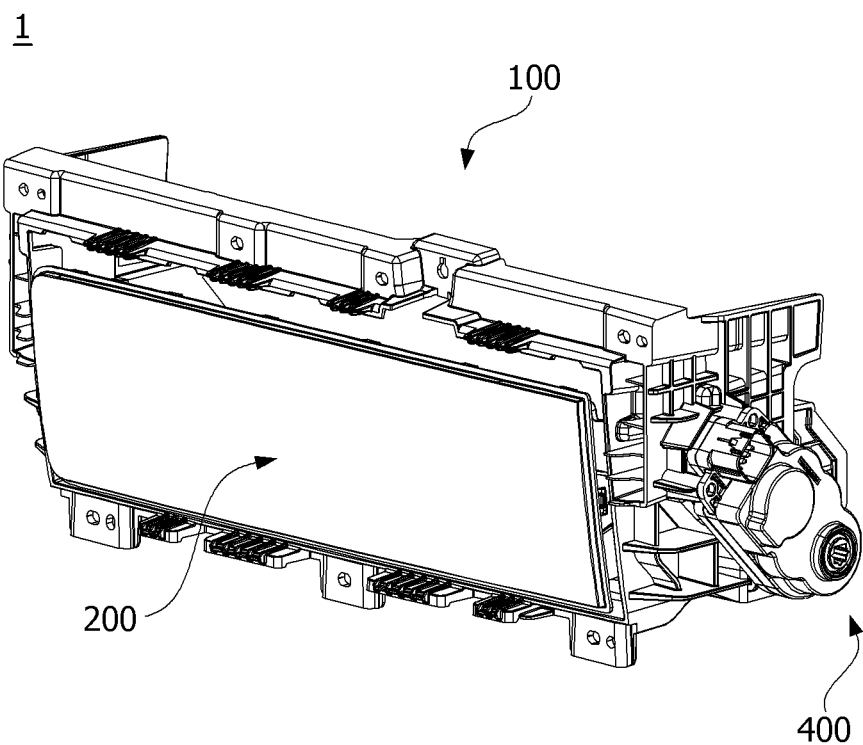

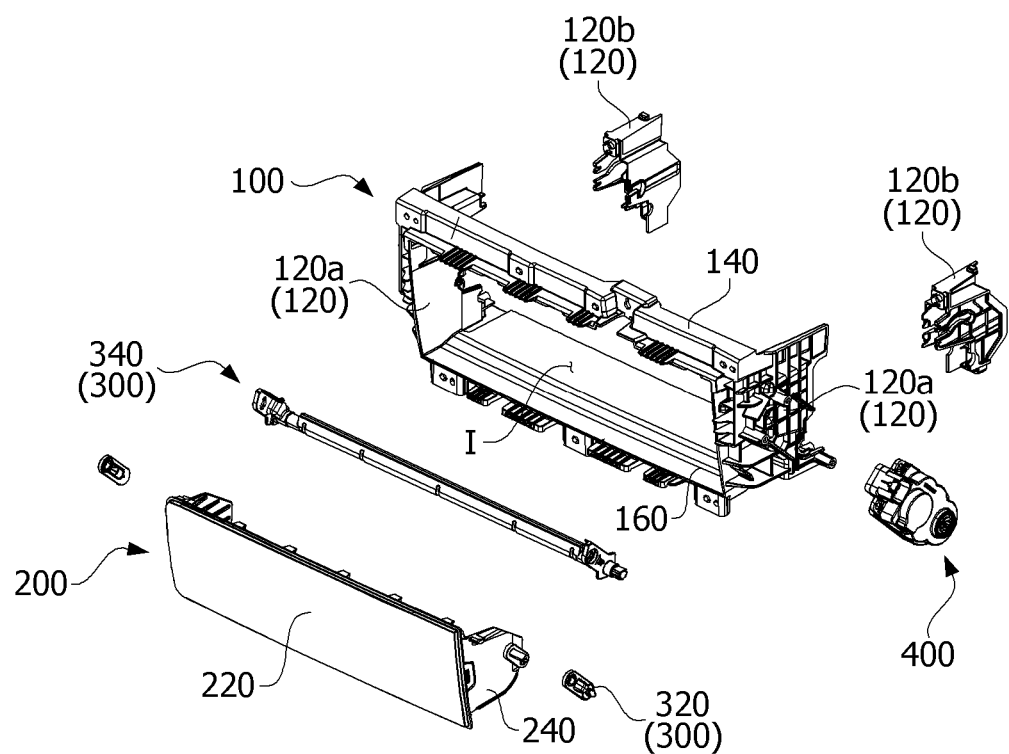
[FIG. 2]

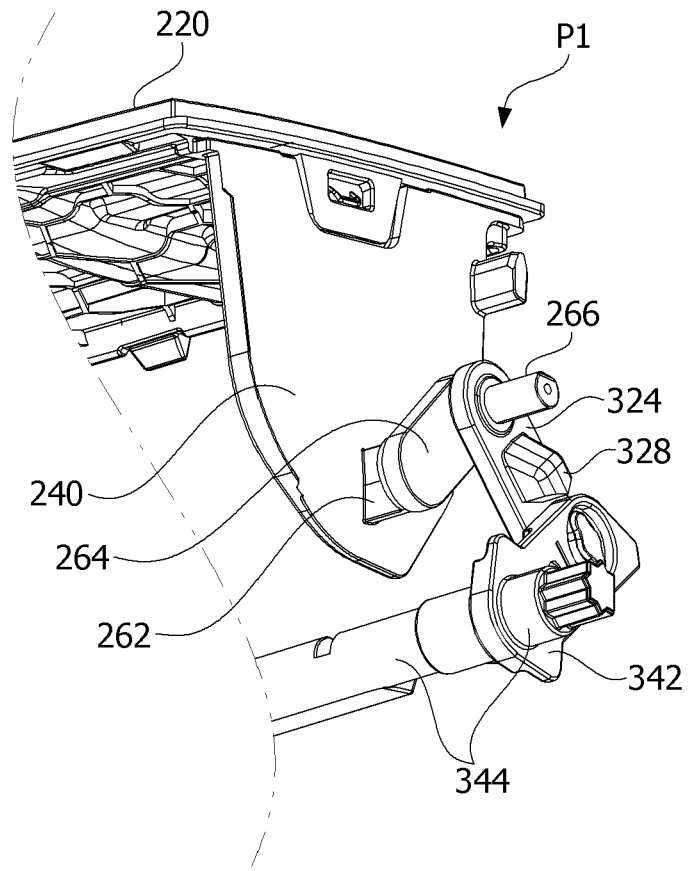
【FIG. 3】

【FIG. 4】
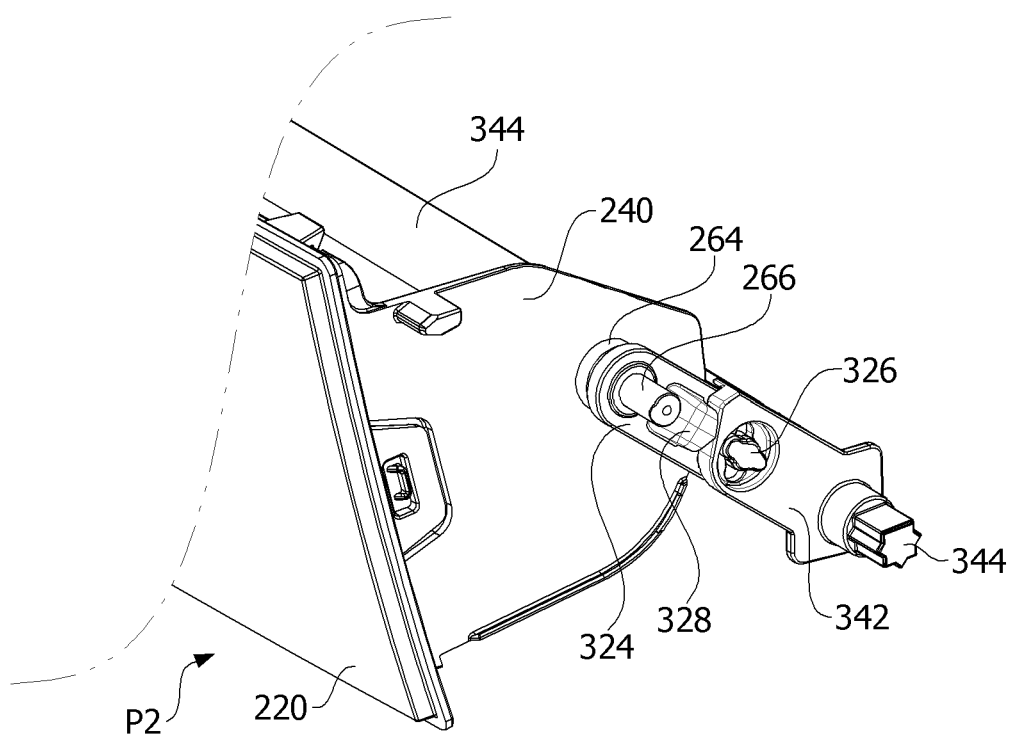

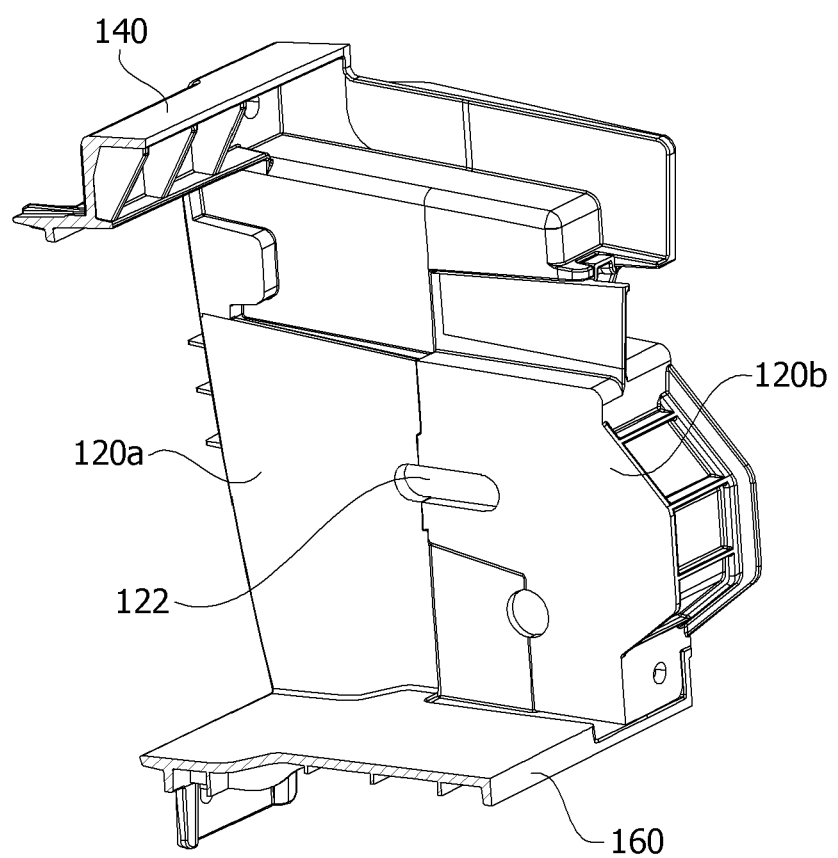
[FIG. 5]

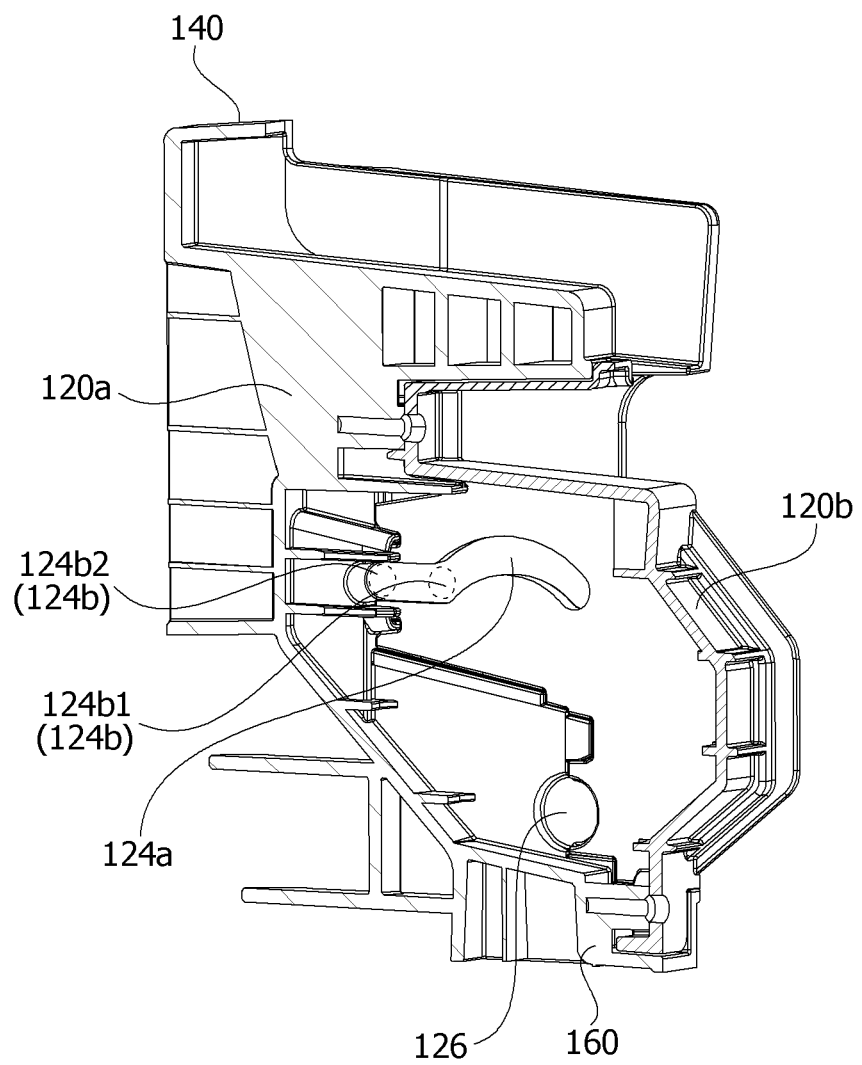
[FIG. 6]

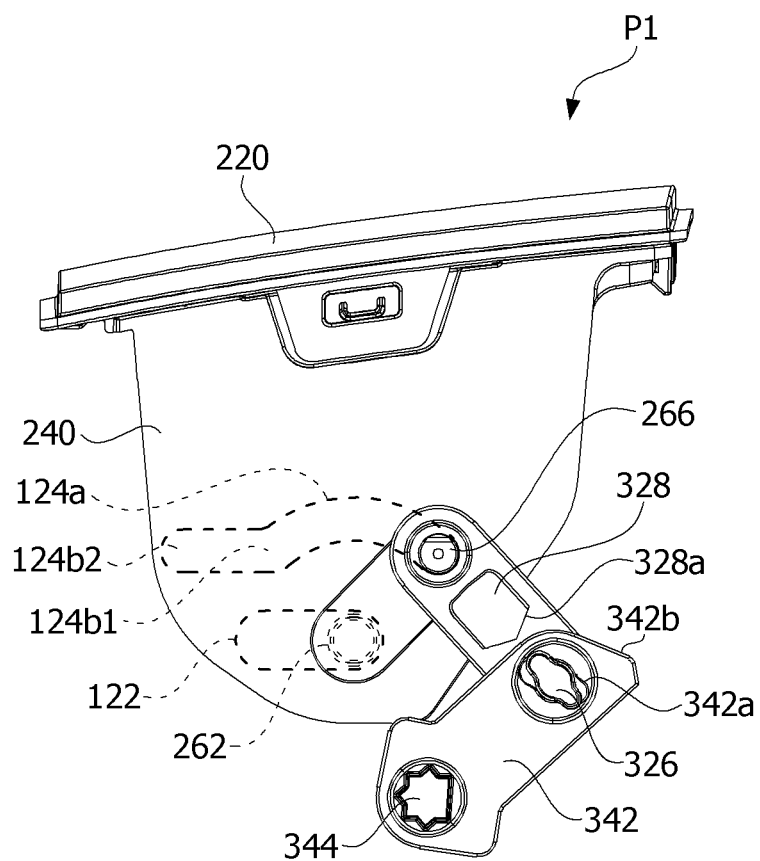
[FIG. 7]

[FIG. 8]
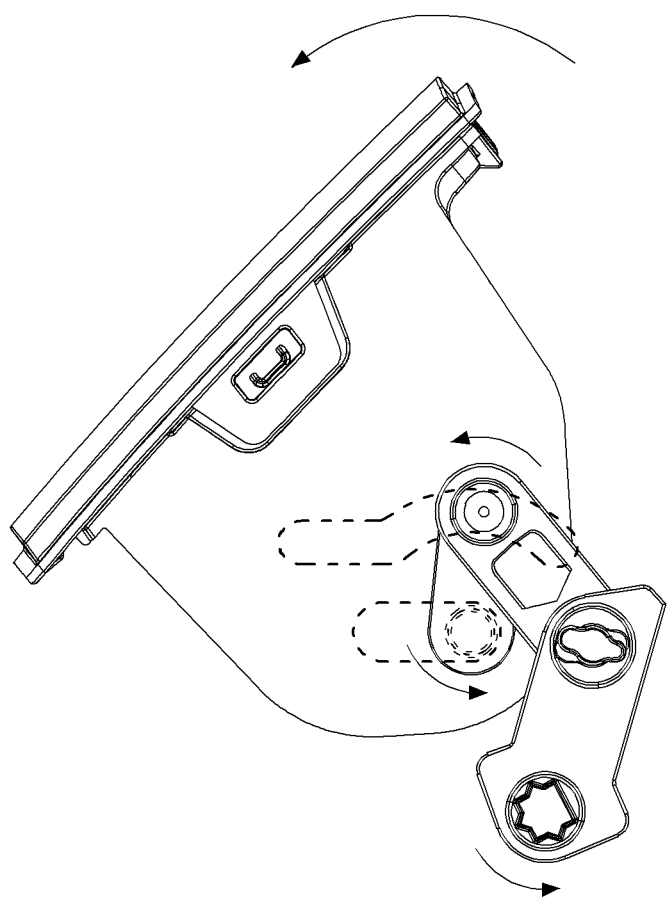

[FIG. 9]
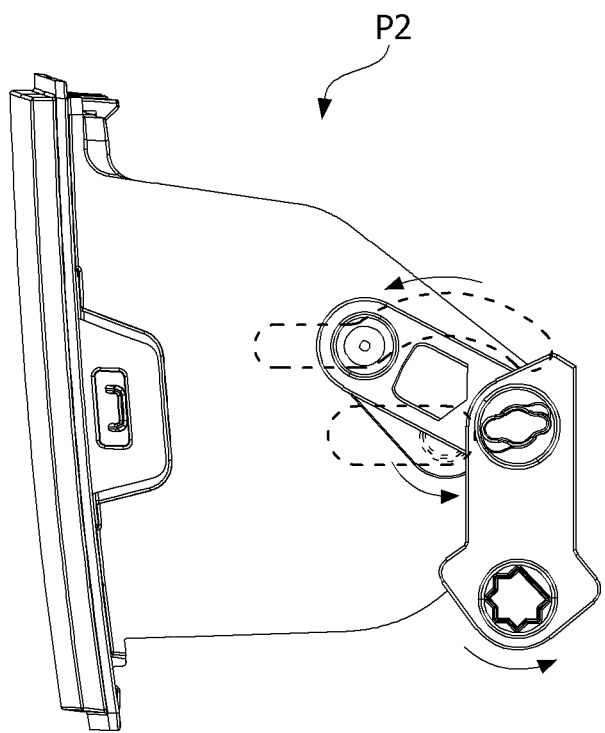

[FIG. 10]
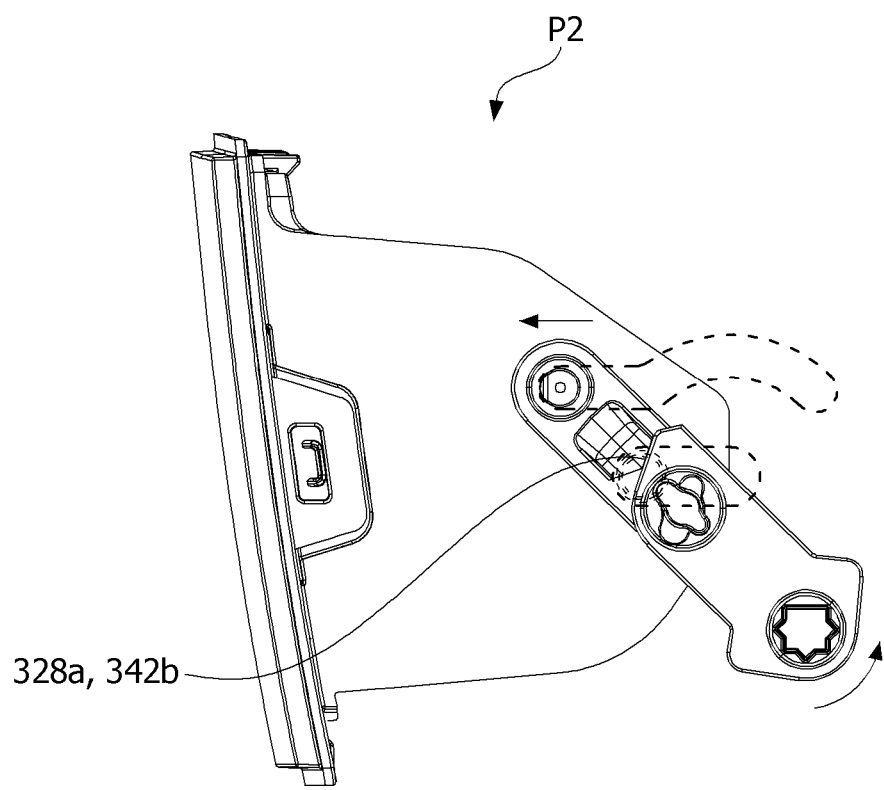
328a, 342b

[FIG. 11]
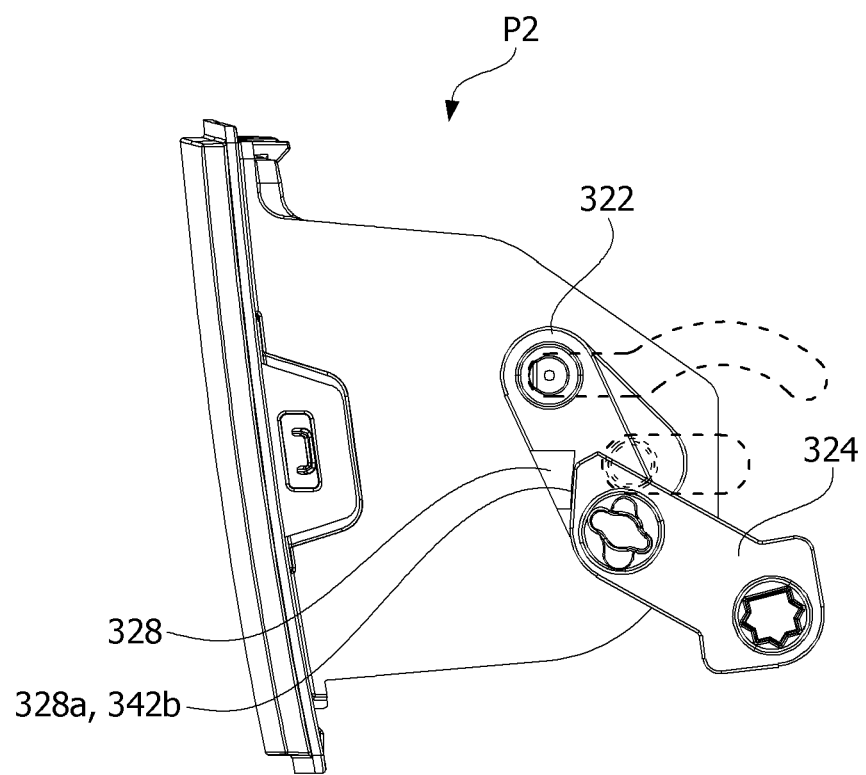

AIR FLAP APPARATUS FOR VEHICLE

CROSS-REFERENCE TO RELATED APPLICATION

This application claims priority to and the benefit of Korean Patent Application No. 10-2023-0030279 filed on Mar. 8, 2023, the disclosure of which is incorporated herein by reference in its entirety.

BACKGROUND

1. Field of the Invention

The present disclosure relates to an air flap apparatus for a vehicle.

2. Discussion of Related Art

To stably operate various heat exchangers in an engine room of a vehicle, external air should be smoothly supplied into the engine room. However, when the vehicle travels at a high speed, a large amount of outside air is introduced at a high speed, and accordingly, air resistance against the vehicle becomes very large. Accordingly, fuel efficiency of the vehicle is degraded.

To solve this problem, an air flap apparatus in which a traveling wind passing through a grill installed in front of the engine room of the vehicle and flowing toward the engine room is introduced into the engine room or inflow of the traveling wind into the engine room is blocked, thereby helping improve fuel efficiency of the vehicle has been developed.

The air flap apparatus may include an air flap, a driving unit that generates power to rotate the air flap, and a power transmission unit that connects the driving unit and the air flap to rotate the air flap while rotating with the power generated by the driving unit.

Among them, the air flap may rotate to be opened or closed to allow the traveling wind introduced from the outside of the vehicle by the driving unit and the power transmission unit to flow into the engine room or block the inflow of the traveling wind into the engine room.

However, an air flap device according to the related art, in a state in which an air flap faces a grill to rotate and block a traveling wind, when the traveling wind moving to an engine room comes into contact with the air flap while a vehicle travels at a high speed, the traveling wind forcibly rotates the air flap, and thus an unintended traveling wind is introduced into the engine room. When a torque of a driving unit is set to be strong to prevent this, the driving unit is overloaded and thus can fail. Accordingly, the smooth operation of the air flap apparatus cannot be achieved.

SUMMARY OF THE INVENTION

The present disclosure is directed to providing an air flap apparatus for a vehicle, which is improved to prevent an air flap from being rotated by a traveling wind generated when the vehicle travels at a high speed.

An air flap apparatus for a vehicle according to an embodiment of the present disclosure includes a frame disposed behind a grill of a vehicle, an air flap that opens or closes an air inlet formed in the frame, a power transmission unit that is connected to the air flap and rotates the air flap, and a driving unit that is disposed outside the frame and generates power, wherein the power transmission unit includes a link that is connected to the air flap and rotates the air flap, and a loader that is connected to the driving unit, is rotated by the power generate by the driving unit, and stops movement of the link when the air flap closes the air inlet.

The link may include a link body that is connected to the air flap and the loader and allows reverse rotation by the loader, the loader may include a loader plate connected to the link body, and the air flap may be is rotatably configured to be disposed at a first position at which the air inlet is open and a second position at which the air inlet is closed.

When the air flap is disposed at the second position, the link body may be disposed parallel to the loader plate.

When the air flap is disposed at the second position, the link body may be disposed to form an obtuse angle with respect to the loader plate.

The link body may include a stopper protruding toward an outside of the air flap from a surface coupled to the loader to come into contact with the loader.

The stopper may include a first inclined surface disposed below the link body in a lengthwise direction.

The loader may include a loader shaft that connects the loader plate and the driving unit, is rotated by the driving unit, and rotates the loader plate.

The loader plate may include a second inclined surface configured to be in contact with the first inclined surface of the link body when the loader plate is rotated, and when the second inclined surface is in contact with the first inclined surface, the first inclined surface and the second inclined surface may be arranged in parallel.

The frame may include a guide groove configured to guide a movement direction of the link that moves interlocking to movement of the loader, and the guide groove includes a curved portion that guides movement of the link body when the air flap is rotated and a straight portion that guides the movement of the link body after the rotation of the air flap is finished.

The straight portion may include a first area connected to the curved portion, and a second area spaced apart from the curved portion, and when the link body is moved from the first area to the second area, the first inclined surface and the second inclined surface may come into contact with each other.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a perspective view of an air flap apparatus for a vehicle according to an embodiment of the present disclosure;

FIG. 2 is an exploded perspective view of an air flap apparatus for a vehicle according to an embodiment of the present disclosure;

FIG. 3 is a view illustrating a coupled state of an air flap and a power transmission unit in a state in which the air flap is disposed at a first position;

FIG. 4 is a view illustrating the coupled state of the air flap and the power transmission unit in a state in which the air flap is disposed at a second position;

FIG. 5 is a cross-sectional view illustrating a first guide hole;

FIG. 6 is a cross-sectional view illustrating a second guide hole;

FIG. 7 is a view illustrating a state in which a second connection shaft of the air flap is disposed on an end of a curved portion of the second guide hole;

FIG. 8 is a view illustrating a state in which the second connection shaft of the air flap is disposed at a center of the curved portion of the second guide hole;

FIG. 9 is a view illustrating a state in which the second connection shaft of the air flap is disposed in a first area of a straight portion of the second guide hole;

FIG. 10 is a view illustrating a state in which the second connection shaft of the air flap is disposed in a second area of the straight portion of the second guide hole; and FIG. 11 is a view illustrating a state in which a second link forms an obtuse angle with respect to a loader plate.

DETAILED DESCRIPTION OF EXEMPLARY EMBODIMENTS

The present disclosure may be modified in various changes and may have various embodiments and is thus intended to describe specific embodiments with the accompanying drawings. However, it should be understood that the present disclosure is not limited to the specific embodiments and includes all changes, equivalents, and substitutions included in the spirit and scope of the present disclosure.

Terms including ordinal numbers such as first and second may be used to describe various components, but the components are not limited by the terms. The terms are used only for the purpose of distinguishing one component from another component. For example, without departing from the scope of the present disclosure, a second component may be referred to as a first component, and similarly, the first component may be referred to as the second component. The term "and/or" includes any or a combination of a plurality of related listed items.

It should be understood that, when it is referenced that a first component is "connected" or "coupled" to a second component, the first component may be directly connected or coupled to the second component, or a third component may be present between the first component and the second component. On the other hand, it should be understood that, when a first component is "directly connected" or "directly coupled" to a second component, a third component is not present therebetween.

In the description of the embodiment, a case in which it is described that a first component is formed "on or under" a second component includes both a case in which the two components are in direct contact with each other and a case in which one or more other components are arranged between the two components. Further, when the term "on or under" is expressed, the term "on or under" may include the meanings of a downward direction as well as an upward direction based on one component.

Terms used in the present application are used only to describe the specific embodiments and are not intended to limit the present disclosure. Singular expressions include plural expressions unless clearly otherwise indicated in the context. It should be understood in the present application that terms such as "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Unless otherwise defined, all terms used herein including technical or scientific terms have the same meanings as those commonly understood by those skilled in the art to which the present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, an air flap apparatus for a vehicle will be described in detail with reference to the accompanying drawings, the same or corresponding components are designated by the same reference numerals regardless of the reference numerals, and the duplicated description thereof will be omitted.

FIG. 1 is a perspective view of an air flap apparatus for a vehicle according to an embodiment of the present disclosure, FIG. 2 is an exploded perspective view of an air flap apparatus for a vehicle according to an embodiment of the present disclosure, FIG. 3 is a view illustrating a coupled state of an air flap and a power transmission unit in a state in which the air flap is disposed at a first position, FIG. 4 is a view illustrating the coupled state of the air flap and the power transmission unit in a state in which the air flap is disposed at a second position, FIG. 5 is a cross-sectional view illustrating a first guide hole, FIG. 6 is a cross-sectional view illustrating a second guide hole, and FIG. 7 is a view illustrating a state in which a second connection shaft of the air flap is disposed on an end of a curved portion of the second guide hole.

Referring to FIGS. 1 to 7, an air flap apparatus 1 for a vehicle according to the embodiment of the present disclosure includes a frame 100 disposed behind a grill (not illustrated) of the vehicle, an air flap 200 that opens or closes an air inlet I formed in the frame 100, a power transmission unit 300 that is connected to the air flap 200 and rotates the air flap 200, and a driving unit 400 that is disposed outside the frame 100 and generates power. In the present embodiment, a forward direction may be a direction from a passenger room to an engine room of the vehicle, and a rearward direction may be a direction from the engine room to the passenger room of the vehicle.

The frame 100 may be disposed in the engine room. The frame 100 may have a quadrangular frame shape, and the inside thereof may be provided with an empty so that the air flap 200 may be disposed therein. The frame 100 may include side parts 120, a top part 140, and a bottom part 160. The air inlet I through which air introduced through the grill of the vehicle is introduced may be formed inside the frame 100. The air inlet I formed by the frame 100 may be opened or closed by the air flap 200.

The side parts 120 may be disposed between the top part 140 and the bottom part 160. The side parts 120 may each be provided as a unit in which a first side portion 120a and a second side portion 120b are combined and may be provided as a plurality of side parts 120. The plurality of side parts 120 may be spaced apart from each other in a direction from a driver's seat to a passenger's seat in the passenger room. The first side portion 120a may support the top part 140 and the bottom part 160, and the second side portion 120b may be provided as a separate component coupled to the first side portion 120a.

The side part 120 may include a first guide hole 122, a second guide hole 124, and a support hole 126.

The first guide hole 122 may guide a movement direction of a link 320. As illustrated in FIG. 5, the first guide hole 122 may be formed in a directional area of the first side portion 120a and the second side portion 120b toward the air inlet I.

The first guide hole 122 may form an area in which a first connection shaft 262 of the air flap 200, which will be described below, may move and may be disposed in a direction from the second side portion 120b toward the first side portion 120a. The first guide hole 122 may be formed in the second side portion 120b, and when the second side portion 120b is coupled to the first side portion 120a, one open side of the first guide hole 122 may be closed.

The second guide hole 124 may guide a movement direction of a link 320, which will be described below and moves in conjunction with movement of a loader 340. The second guide hole 124 may be disposed above the first guide hole 122. The second guide hole 124 may include a curved portion 124a and a straight portion 124b.

The curved portion 124a may be disposed at a position at which one area overlaps the first guide hole 122 in a direction from the second guide hole 124 toward the first guide hole 122. The curved portion 124a may guide the movement of the first connection shaft 262 of the air flap 200, which will be described below. Further, when the air flap 200 is rotated, the curved portion 124a may guide movement of a link body 322 which will be described below and is moved along the first connection shaft 262.

The straight portion 124b may have a shape extending from one end of the curved portion 124a. The straight portion 124b may be disposed parallel to a first guide groove. The straight portion 124b may guide the movement of the link body 322 after the rotation of the air flap 200 is finished. The straight portion 124b may include a first area 124b1 and a second area 124b2.

The first area 124b1 may be an area connected to the curved portion 124a. The first area 124b1 may allow the first connection shaft 262 of the air flap 200 to move linearly, the first connection shaft 262 being guided by the curved portion 124a to form a curved line.

The second area 124b2 may be an area spaced apart from the curved portion 124a and may be an area connected to the first area 124b1. The second area 124b2 may guide a movement direction of the first connection shaft 262 of the air flap 200 reaching the first area 124b1. The second area 124b2 may be disposed on an outer side of the first guide hole 122. The second side portion 120b is coupled to the first side portion 120a, one open side of the second area 124b2 may be closed.

The support hole 126 may be formed at a coupling portion at which the first side portion 120a and the second side portion 120b meet each other. In more detail, a first groove formed in the first side portion 120a and a second groove formed in the second side portion 120b meet each other to form the circular support hole 126. The support hole 126 may support a loader shaft 344 of the power transmission unit 300, which will be described below.

The top part 140 and the bottom part 160 may be arranged on ends of the side part 120. The top part 140 and the bottom part 160 may be supported by the side part 120.

The air flap 200 may be disposed inside the frame 100. In more detail, the air flap 200 may be disposed at a position at which the air inlet I formed inside the frame 100 may be opened or closed. The air flap 200 may rotate inside an air inlet. The air flap 200 may include an opening and closing part 220, a third side part 240, and a rotation part 260.

The opening and closing part 220 may be a rectangular plate. The opening and closing part 220 may open or close the air inlet. The opening and closing part 220 may be disposed in a direction in which the plurality of side parts 120 of the frame 100 are arranged.

The third side part 240 may be disposed behind the opening and closing part 220. The third side part 240 may support the opening and closing part 220. The third side part 240 may be disposed behind the top part 140 and the bottom part 160, and one side and the other side of the third side part 240 may be covered by the side part 120. The third side part 240 may be rotated by the rotation part 260.

The rotation part 260 may be formed integrally with the third side part 240. The rotation part 260 may be disposed in a direction from the third side part 240 to the outside of the third side part 240. The rotation part 260 may be connected to the power transmission unit 300 and rotate the opening and closing part 220 and the third side part 240 by the power transmission unit 300. The rotation part 260 may include a first connection shaft 262, a support body 264, and a second connection shaft 266.

The first connection shaft 262 may have a shape protruding from the third side part 240 toward the side part 120 of the frame 100. The first connection shaft 262 may be formed by combining a semi-cylindrical protrusion and a cylindrical protrusion. The first connection shaft 262 may support the support body 264. The first connection shaft 262 may be movably disposed in the first guide hole 122 of the side part 120 of the frame 100. The first connection shaft 262 may be disposed on one end of the support body 264. That is, the first connection shaft 262 may connect the third side part 240 and the support body 264.

The support body 264 may be disposed on one end of the first connection shaft 262. The support body 264 may be a rectangular plate having a circular end. The support body 264 may support the second connection shaft 266. The support body 264 may be disposed between the third side part 240 of the air flap 200 and the link body 322 of the power transmission unit 300, which will be described below.

The second connection shaft 266 may be disposed at the other end of the support body 264. The second connection shaft 266 may have a shape protruding from the support body 264 toward the side part 120 of the frame 100. The second connection shaft 266 may be provided in a cylindrical shape. The second connection shaft 266 may support the link body 322, which will be described below. The second connection shaft 266 may be movably disposed in the second guide hole 124 of the side part 120 of the frame 100 while supporting the link body 322.

As illustrated in FIGS. 3 and 4, the air flap 200 may be disposed at each of a first position P1 and a second position P2 by the power transmission unit 300 moving through the driving unit 400. The air flap 200 disposed at the first position P1 may open the air inlet I illustrated in FIG. 2, and the air flap 200 disposed at the second position P2 may close the air inlet I illustrated in FIG. 2.

The power transmission unit 300 may help open or close the air inlet I of the air flap 200 while being rotated by the driving unit 400. The power transmission unit 300 may include the link 320 and the loader 340.

The link 320 may be connected to the air flap 200 to rotate the air flap 200. The link 320 may move in conjunction of the movement of the loader 340 rotated by the driving unit 400. The link 320 may include the link body 322, a first coupling hole 324, a locking portion 326, and a stopper 328.

The link body 322 may be a rectangular plate having ends with rounded corners. The link body 322 may be disposed between the support body 264 of the air flap 200 and a loader plate 342 of the loader 340, which will be described below.

The first coupling hole 324 may be disposed at one end of the link body 322. The first coupling hole 324 may support the second connection shaft 266 of the air flap 200. When the second connection shaft 266 passes through the first coupling hole 324, the link body 322 may be coupled to the first connection shaft 262. The link body 322 may move in conjunction with movement of the second connection shaft 266 passing through the first coupling hole 324. In more detail, the link body 322 may be rotated or moved forward or rearward by the second connection shaft 266 moving along the curved portion 124a of the second guide hole 124. Further, the link body 322 may be moved in a direction from the frame 100 toward the grill (not illustrated) of the vehicle or a direction opposite thereto by the second connection shaft 266 moving along the straight portion 124b of the second guide hole 124.

The locking portion 326 may be disposed on the other end of the link body 322. The locking portion 326 may protrude in the same direction as a direction in which the second connection shaft 266 of the air flap 200 protrudes. The locking portion 326 may pass through a second coupling hole 342a of the loader 340, which will be described below, to prevent separation of the link body 322 or the loader plate 342, which will be described below.

The stopper 328 may protrude from a surface coupled to the loader 340 toward the outside of the air flap 200. The stopper 328 may be disposed between the first coupling hole 324 and the locking portion 326. The stopper 328 may be in contact with the loader 340.

The stopper 328 may include a first inclined surface 328a. The first inclined surface 328a may be disposed below the stopper 328 in a lengthwise direction of the link body 322. When the link 320 rotates along the air flap 200, the first inclined surface 328a may come into contact with the loader 340 to stop the rotation of the link 320.

The loader 340 may be connected to the driving unit 400. The loader 340 may be rotated by power generated by the driving unit 400 and stop the movement of the link 320 when the air flap 200 closes the air inlet I. The loader 340 may include the loader plate 342 and the loader shaft 344.

The loader plate 342 may be disposed outside the link body 322. Further, the loader plate 342 may be disposed in an inner space formed by coupling the first side portion 120a and the second side portion 120b of the frame 100. The loader plate 342 may be provided as a plurality of loader plates 342, and the plurality of loader plates 342 may be arranged in the plurality of side parts 120 that support the top part 140 and the bottom part 160 of the frame 100. When the loader shaft 344 is rotated, the loader plate 342 may be rotated in the same direction as a direction in which the loader shaft 344 is rotated. The loader plate 342 may include the second coupling hole 342a and a second inclined surface 342b.

The second coupling hole 342a may be disposed at one end of the loader plate 342. When the loader plate 342 is coupled to the link body 322, the second coupling hole 342a may be disposed at a position at which the locking portion 326 of the link 320 may be accommodated. The locking portion 326 may pass through the second coupling hole 342a. The second coupling hole 342a may have a shape corresponding to an outer shape of the locking portion 326. When the loader plate 342 is rotated by the loader shaft 344 after the second connection shaft 266 passes through the second coupling hole 342a, the locking portion 326 is misaligned with the second coupling hole 342a, and thus the loader plate 342 may be fixed to the link body 322.

The second inclined surface 342b may be formed at an end of the loader plate 342. The second inclined surface 342b may be in contact with the first inclined surface 328a of the link body 322. In more detail, when the loader plate 342 is rotated, the second inclined surface 342b may come into contact with the first inclined surface 328a to press the first inclined surface 328a.

When the second inclined surface 342b is in contact with the first inclined surface 328a, the first inclined surface 328a and the second inclined surface 342b may be arranged in parallel. Thus, since the second inclined surface 342b uniformly presses the entire area of the first inclined surface 328a, an operation in which the loader plate 342 stops the movement of the link 320 may be smoothly performed.

The loader shaft 344 may connect the loader plates 342 arranged at the plurality of side parts 120 of the frame 100. The loader shaft 344 may have a shape protruding from an inside of each loader plate 342 to the outside of a surface of the loader plate 342 facing the frame 100. An end of the loader shaft 344 may be connected to the driving unit 400. The loader shaft 344 may connect the loader plate 342 and the driving unit 400. The loader shaft 344 may be rotated by the driving unit 400 to rotate the loader plate 342. The loader shaft 344 may be formed integrally with the loader plate 342, but the present disclosure is not limited thereto. The loader shaft 344 may be provided as a component separate from the loader plate 342. An end of the loader shaft 344 may pass through the support hole 126 formed in the frame 100 and protrude outward from the frame 100.

The driving unit 400 may be coupled to the frame 100. The driving unit 400 may be coupled to the end of the loader shaft 344 passing through the support hole 126 of the frame 100 while disposed outside the frame 100. The driving unit 400 may generate power to rotate the loader shaft 344. The driving unit 400 may include an actuator.

Hereinafter, a process in which the air flap 200 is disposed from the first position P1 to the second position P2 and a structure in which the power transmission unit 300 supports the air flap 200 disposed at the second position P2 will be described.

FIG. 8 is a view illustrating a state in which the second connection shaft of the air flap is disposed at a center of the curved portion of the second guide hole, and FIG. 9 is a view illustrating a state in which the second connection shaft of the air flap is disposed in a first area of a straight portion of the second guide hole, and FIG. 10 is a view illustrating a state in which the second connection shaft of the air flap is disposed in a second area of the straight portion of the second guide hole.

Referring to FIGS. 1 to 7, the air flap 200 disposed at the first position P1 opens the air inlet I illustrated in FIG. 2. In this state, as illustrated in FIG. 7, the first connection shaft 262 of the air flap 200 is disposed at a right end of the first guide hole 122 of the frame 100, and the second connection shaft 266 is disposed at a right end of the curved portion 124a of the second guide hole 124. Further, the loader plate 342 is disposed at a position at which an angle close to a right angle with respect to the link body 322 is formed and is disposed at a position at which an angle close to parallel with the link body 322 is formed.

Referring to FIGS. 1 to 8, when the driving unit 400 is operated to generate power, the loader shaft 344 connected to the driving unit 400 may be rotated. In more detail, the loader shaft 344 may be rotated counterclockwise with respect to FIGS. 7 and 8.

In this case, the air flap 200 disposed at the first position P1 may be rotated toward the second position P2 by the power transmission unit 300. In more detail, when the loader shaft 344 is rotated, the link body 322 may be rotated together with the loader plate 342 through the locking portion 326. In this process, since the first connection shaft 262 of the air flap 200 serves as a rotation center between a fixed shaft and the air flap 200, the air flap 200 may be rotated about the first connection shaft 262.

Since the air flap 200 is rotated about the first connection shaft 262, the link body 322 connected to the second connection shaft 266 of the air flap 200 may be moved inside the curved portion 124a of the second guide hole 124 along the second connection shaft 266 rotated about the first connection shaft 262 of the air flap 200. In this state, the air flap 200 is disposed between the first position P1 and the second position P2.

Referring to FIGS. 1 to 9, when the driving unit 400 continuously generates power in the state of FIG. 8, the loader shaft 344 connected to the driving unit 400 may be continuously rotated counterclockwise with respect to FIGS. 7 to 9.

In this case, the air flap 200 may be disposed at the second position P2 in conjunction of the movement of the power transmission unit 300. In more detail, when the loader shaft 344 is further rotated in the state of FIG. 8, the loader plate 342 may rotate the link body 322 while being rotated together with the loader shaft 344. The link body 322 may be rotated about the first connection shaft 262 of the air flap 200.

While the link body 322 is rotated, the second connection shaft 266 of the air flap 200 connected to the link body 322 may be moved from a central area of the curved portion 124a of the second guide hole 124 to the first area 124b1 of the straight portion 124b. Accordingly, the loader plate 342 connected to the link body 322 may be disposed parallel to the frame 100 in a height direction.

Referring to FIGS. 1 to 10, when the driving unit 400 continuously generates power in the state of FIG. 9, the loader shaft 344 connected to the driving unit 400 may be continuously rotated counterclockwise with respect to FIGS. 7 to 9.

Accordingly, the loader plate 342 is rotated together with the loader shaft 344 so that the second inclined surface 342b of the loader plate 342 may come into contact with the first inclined surface 328a of the link body 322. Since the second inclined surface 342b presses the first inclined surface 328a while the second inclined surface 342b comes into contact with the first inclined surface 328a, the link body 322 may be rotated in a reverse direction opposite to the direction in which the link body 322 is rotated in a process from FIG. 7 to FIG. 9.

In this state, since the loader plate 342 is continuously rotated together with the loader shaft 344, the second inclined surface 342b continuously presses the first inclined surface 328a, and the second connection shaft 266 of the air flap 200 connected to the link body 322 may be moved from the first area 124b1 to the second area 124b2 of the straight portion 124b of the second guide hole 124 of the frame 100. Accordingly, the link body 322 may be disposed parallel to the loader plate 342. Further, the first connection shaft 262 of the air flap 200 may be moved from a right end to a left end with respect to FIG. 10. Thus, the support body 264 of the air flap 200 may be disposed parallel to the link body 322 of the power transmission unit 300.

When the link body 322 is disposed parallel to the loader plate 342 by the first inclined surface 328a and the second inclined surface 342b in contact with each other, the first connection shaft 262 is disposed at a left end of the first guide hole 122, and the second connection shaft 266 is disposed in the second area 124b2 of the straight portion 124b of the second guide hole 124, the rotation of the air flap 200 can be prevented. Thus, even when air outside the vehicle passes through the grill and collides with the air flap 200, a state in which the air flap 200 closes the air inlet I is stably maintained, and thus unnecessary inflow of the air into an engine of the vehicle can be prevented.

In this way, in the air flap apparatus 1 for a vehicle according to the embodiment of the present disclosure, the first inclined surface 328a and the second inclined surface 342b are in contact with each other, the link body 322 is disposed parallel to the loader plate 342, and thus closing stability of the air inlet I of the air flap 200 can be improved. Thus, excessive output of the driving unit 400 for preventing the rotation of the air flap 200 is prevented, and thus a lifetime of the driving unit can be maintained.

FIG. 11 is a view illustrating a state in which a second link forms an obtuse angle with respect to a loader plate.

Referring to FIG. 11, the stopper 328 of the power transmission unit 300 may be disposed at a position at which the link body 322 may form an obtuse angle with respect to the loader plate 342 inside the link body 322.

In more detail, when the second inclined surface 342b continuously presses the first inclined surface 328a in a state in which the second inclined surface 342b of the loader plate 342 is in contact with the first inclined surface 328a of the stopper 328, as illustrated in FIG. 11, as the link body 322 and the loader plate 342 are rotated in directions opposite to each other, the link body 322 may form an obtuse angle with respect to the loader plate 342. In this way, even in a state in which the link body 322 and the loader plate 342 form an obtuse angle with respect to each other, the rotation of the air flap 200 can be prevented through the first inclined surface 328a and the second inclined surface 342b in contact with each other.

In the air flap apparatus 1 for a vehicle according to the present disclosure, an arrangement state of the link body 322 and the loader plate 342 can change according to a position at which the stopper 328 is disposed in the link body 322, and even in various arrangement states of the link body 322 and the loader plate 342, the rotation of the air flap 200 can be prevented through the first inclined surface 328a and the second inclined surface 342b in contact with each other.

According to an embodiment of the present disclosure, in a state in which an air flap closes an air inlet, a stopper and a loader push the air flap in a direction opposite to a direction in which a traveling wind is introduced. Accordingly, it is possible to prevent a phenomenon in which the air flap rotates even when the traveling wind comes into contact with the air flap.

Although embodiments of the present disclosure have been described above, those skilled in the art may understand that the present disclosure may be variously modified and changed without departing from the spirit and scope of the present disclosure described in the appended claims. Further, differences related to these changes and modifications should be construed as being included in the scope of the present disclosure defined in the appended claims.

What is claimed is:

1. An air flap apparatus for a vehicle, comprising:
a frame disposed behind a grill of a vehicle;
an air flap configured to open or close an air inlet formed in the frame;
an actuator disposed outside the frame and configured to provide rotational power;
a link and a load connected to the air flap and configured to rotate the air flap,
the loader rotated by the rotational power provided by the actuator, and configured to stop movement of the link when the air flap closes the air inlet, wherein the link includes a link body that is connected to the air flap and the loader and allows reverse rotation by the loader,
the loader includes a loader plate connected to the link body,
the air flap is rotatably configured to be disposed at a first position at which the air inlet is open and a second position at which the air inlet is closed, and
when the air flap is disposed at the second position, the link body is disposed parallel to the loader plate.

2. The air flap apparatus of claim 1, wherein, when the air flap is disposed at the second position, the link body is disposed to form an obtuse angle with respect to the loader plate.

3. The air flap apparatus of claim 1, wherein the link body includes a stopper protruding toward an outside of the air flap from a surface coupled to the loader to come into contact with the loader.

4. The air flap apparatus of claim 3, wherein the stopper includes a first inclined surface disposed below the link body in a lengthwise direction.

5. The air flap apparatus of claim 1, wherein the loader includes a loader shaft connecting the loader plate and the the actuator, rotated by the actuator, and configured to rotate the loader plate.

6. The air flap apparatus of claim 4, wherein the loader plate includes a second inclined surface configured to be in contact with the first inclined surface of the link body when the loader plate is rotated, and
when the second inclined surface is in contact with the first inclined surface, the first inclined surface and the second inclined surface are arranged in parallel.

7. The air flap apparatus of claim 6, wherein the frame includes a guide groove configured to guide a movement direction of the link body that moves interlocking to movement of the loader, and
the guide groove includes:
a curved portion configured to guide movement of the link body when the air flap is rotated; and
a straight portion configured to guide the movement of the link body after the rotation of the air flap is finished.

8. The air flap apparatus of claim 7, wherein the straight portion includes:
a first area connected to the curved portion; and
a second area spaced apart from the curved portion, and
when the link body is moved from the first area to the second area, the first inclined surface and the second inclined surface come into contact with each other.

* * * * *